United States Patent
Fischer et al.

[11] 3,923,625
[45] Dec. 2, 1975

[54] REINFORCED GLASS ELECTRODE STRUCTURE

[75] Inventors: David J. Fischer, Corning, N.Y.; Hans J. Kunz; Thomas E. Norby, both of Raleigh, N.C.

[73] Assignee: Corning Glass Works, Corning, N.Y.

[22] Filed: May 10, 1974

[21] Appl. No.: 468,750

Related U.S. Application Data

[63] Continuation of Ser. No. 158,448, June 30, 1971, abandoned.

[52] U.S. Cl........... 204/195 G; 204/286; 204/297 R
[51] Int. Cl.²......................................... G01N 27/36
[58] Field of Search....................... 204/1 T, 195 G

[56] References Cited
UNITED STATES PATENTS

| | | | |
|---|---|---|---|
| 2,117,596 | 5/1938 | Bender et al. | 204/195 G |
| 3,188,285 | 6/1965 | Watanabe et al. | 204/195 G |
| 3,458,422 | 7/1969 | Proctor | 204/195 G |
| 3,700,577 | 10/1972 | Grauer | 204/195 G |

FOREIGN PATENTS OR APPLICATIONS

| | | | |
|---|---|---|---|
| 492,936 | 9/1938 | United Kingdom | 204/195 G |
| 1,237,808 | 3/1967 | Germany | 204/195 M |

*Primary Examiner*—T. Tung
*Attorney, Agent, or Firm*—William J. Simmons, Jr.; Walter S. Zebrowski; Clarence R. Patty, Jr.

[57] ABSTRACT

Disclosed are a reinforced electrode structure for measuring the concentration of an ionic species in an ion containing solution and a method of making such a structure. A thin film conductive electrode is strongly bonded to one surface of a thin membrane of glass sensitive to the ionic species. A conductive lead wire makes electrical contact with the electrode. A mass of non-conductive reinforcing backing material having a thermal coefficient of expansion greater than that of the membrane strongly adheres to the conductive electrode and the membrane. The backing material is cured or solidified at a temperature sufficiently higher than the temperature at which the electrode structure is to be used so that contraction of the backing material during curing places the membrane in a state of compression, thereby strengthening the same.

21 Claims, 11 Drawing Figures

U.S. Patent  Dec. 2, 1975  Sheet 1 of 2  3,923,625
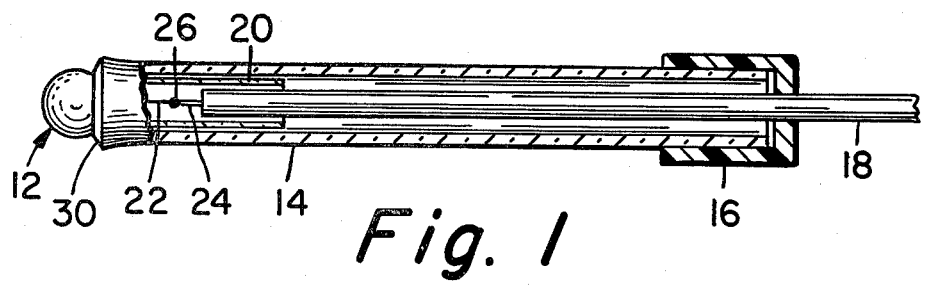
Fig. 1
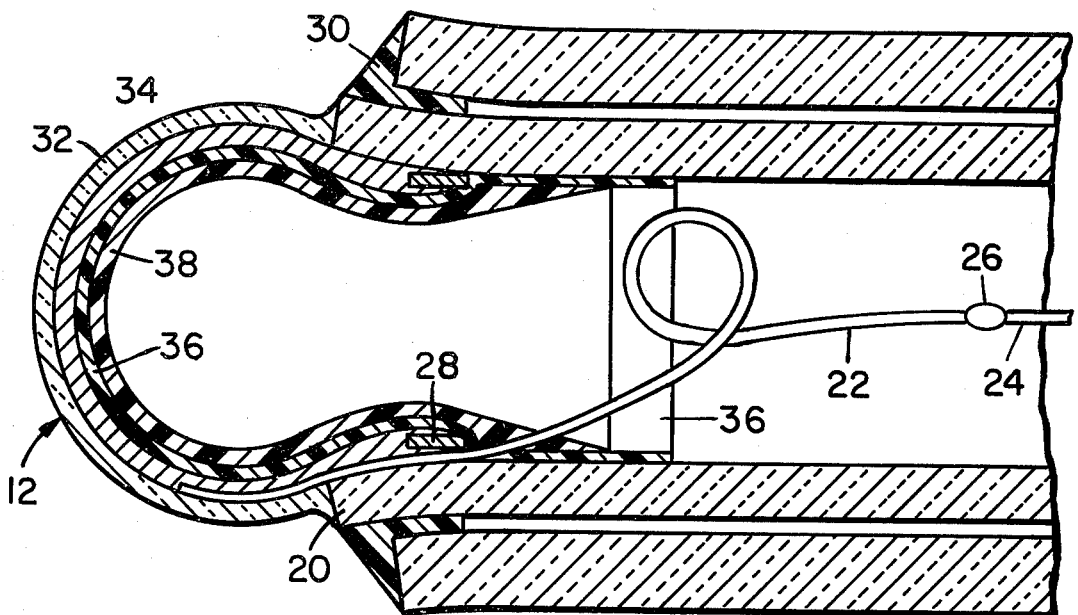
Fig. 2
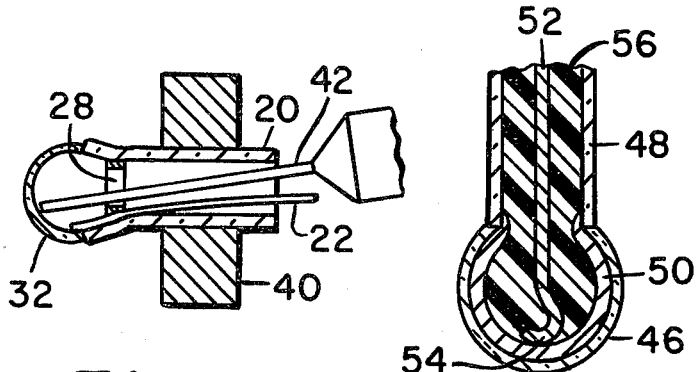
Fig. 3
Fig. 4
INVENTORS.
David J. Fischer
Hans J. Kunz
Thomas E. Norby
BY
William J. Simmons Jr INVENTORS.
David J. Fischer
Hans J. Kunz
Thomas E. Norby
BY William J. Simmons Jr.

REINFORCED GLASS ELECTRODE STRUCTURE

This is a continuation of application Ser. No. 158,448, filed June 30, 1971, now abandoned.

CROSS-REFERENCE TO RELATED APPLICATIONS

This application is related to application Ser. No. 469,079 entitled "Glass Electrode Structure for Radio Capsules" filed by us on May 13, 1974.

BACKGROUND OF THE INVENTION

This invention relates to solid, reinforced glass electrode structures for the determination of ion activities, and a method of making such structures.

The use of glass electrode structures for determining and measuring an ionic species in ionic solution is now commonplace. In one usual form, the glass electrode structure comprises a tube made, at least in part, of an ion-sensitive glass. Glasses preferentially sensitive to hydrogen ion, potassium ion, sodium ion and the like are well known. The tube is sealed at one end to form an enclosure which is backed with a liquid electrolyte. The electrode structure also includes a conductive lead wire in contact with this internal electrolyte. When the tube exterior is in contact with a solution containing ions to which it is sensitive, a charge develops across the glass between the external solution and the constant internal electrolyte. The glass electrode structure in contact with the external solution essentially constitutes a half cell.

The previously described glass electrode structure is normally employed with conventional pH equipment, the active ion sensing electrode structure being operatively connected to a standard half-cell by means of high impedance, high gain electrometric amplification equipment. Such high impedance equipment is required to measure the potential of the electrode structure since the resistivity of ion-sensitive glasses is about $10^{10}$ ohm-cm, even for so-called low resistance glasses which exhibit substantial ion sensitivity. Hence, the usual practice is to form the membrane of ion sensitive glass as a thin bulbous structure to reduce the impedance thereof. Such electrodes may have an impedance of 100 megohms or more due to practical size limitations of the exposed sensing area.

While such electrode structures measure ion activity fairly rapidly and accurately and are well adapted for continuous measurement, their usage poses several problems. Due to their inherent fragility arising out of the necessary thinness of the membrane, such electrode structures are subject to breakage and failure. Furthermore, when attempts have been made to miniaturize this type of electrode structure the impedance thereof increases as the area of the ion sensitive membrane decreases, thereby placing an additional burden on lead insulation and on the electrometric amplification equipment which most possess extremely high input impedance.

Attempts to provide stronger electrode structures have resulted in relatively high impedance structures. U.S. Pat. No. 3,282,817 issued Nov. 1, 1966 to J. H. Riseman et al. discloses an ion-sensitive glass tube in which there is disposed the usual metallic, electrically conductive lead wire and a mass of solid, electrically conductive fused crystalline material in contact with both the lead wire and the ion-sensitive glass. This crystalline material may consist of a salt of silver or thallium. However, electrodes of this type made with fused silver chloride, silver bromide, silver iodide or mixtures thereof are generally of high impedance, e.g. 100 to 1,000 megohms, the glass membrane accounting for only a small part of the total impedance. It appears that a very thin film of silver salt offers a high resistance in such a dry electrode structure and extremely small electrodes of this type cannot be used in applications where low impedance is required.

SUMMARY OF THE INVENTION

An object of the present invention is to provide an improved ion-activity measuring electrode structure which is characterized particularly by its low impedance, its improved mechanical strength, and its versatility in the variety of forms and sizes in which it can be constructed. A further object of the present invention is to provide a method for making rugged, ion-activity measuring electrode structures. Another object of the present invention is to provide an ion-sensing electrode structure exhibiting low preconditioning times and rapid response to change in ion activity.

Generally, to achieve the foregoing objects, the present invention comprises an electrode structure including a membrane of glass which is sensitive to an ionic species. A thin film conductive electrode is strongly bonded to at least a portion of one surface of the membrane. In order to couple to a measuring device any potential existing across the glass membrane, there is provided a conductive lead wire in electrical contact with the conductive electrode. To permit the use of thin membranes and to increase the strength thereof, a mass of non-conductive backing material is strongly bonded to the conductive electrode and to that portion of the membrane on which the conductive electrode is not disposed. This backing material reinforces the electrode structure, and in some forms of construction it insulates the conductive electrode from the surface of the membrane opposite the surface on which the conductive electrode is disposed.

Since the electrode structure of the present invention can utilize extremely thin glass membranes, the impedance thereof can be very low; however, the present invention is not limited to low impedance electrode structures.

BRIEF DESCRIPTION OF THE DRAWING

FIG. 1 is a partial cross-sectional view of an ion sensing electrode formed in accordance with the present invention.

FIG. 2 is an enlarged cross-sectional view showing in greater detail a portion of the electrode of FIG. 1.

FIG. 3 illustrates a method for applying a thin coating of a solution to the inner surface of a bulbous membrane.

FIG. 4 is a cross-sectional view of an alternative embodiment wherein the inner portion of the electrode structure is completely filled with non-conductive backing material.

FIG. 6 shows apparatus for blowing a cylindrical membrane. FIG. 7 shows apparatus for applying a conductive electrode inside the cylindrical membrane. FIG. 8 illustrates a method of supporting the fragile membrane and severing it from the stem. FIG. 9 shows the membrane-elec

DETAILED DESCRIPTION

Figure 5:
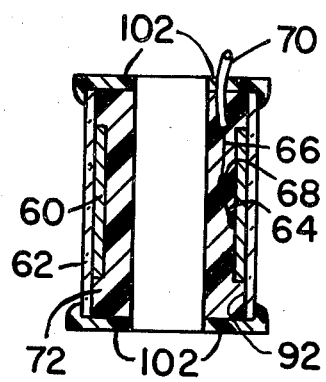
FIG. 5 is a cross-sectional view of a cylindrical electrode structure.

Referring to FIGS. 1 and 2 there is shown an ion-sensing electrode structure comprising a sensing portion 12 mounted at the end of a glass tube 14. Affixed to the end of tube 14 opposite sensing portion 12 is an end cap 16 having a hole therein through which shielded cable 18 extends. Sensing portion 12 is formed at the end of a glass stem 20 which extends into and is preferably separated from tube 14. A conductive lead wire 22 extending from sensing portion 12 is electrically connected to the inner conductor 24 of shielded cable 18 by a solder connection 26.

In FIG. 2, wherein the sensing portion 12 is shown in greater detail, lead wire 22 is secured to stem 20 by a retainer ring 28 which is preferably made of conductive material. The end of stem 20 is flared to permit ring 28 to be easily and tightly inserted therein. The retainer ring may consist of a slotted ring which can be compressed prior to insertion into the stem. Such a slotted ring would exert a force on the stem which would help to retain it in either a flared or a non-flared stem. The corresponding end of tube 14 is also flared to facilitate the insertion of stem 20 therein. The flared end of stem 20 is sealed to the flared end of tube 14 by a seal 30 which preferably consists of a resilient material such as silicone or rubber. Seal 30 absorbs shock and thereby contributes to the break resistant properties of the ion-sensing electrode.

Sensing portion 12 comprises a thin spherically shaped membrane 32 of ion-sensitive glass formed on the flared end of stem 20 which may consist of any type of glass that is suitable for supporting the thin walled membrane 32.

Since stem 20 is to form a part of the resulting electrode structure, it preferably comprises a standard high resistivity glass, i.e., one having a specific resistivity of at least $10^{14}$ ohm-cm. Membrane 32 may consist of any ion-sensitive glass composition such as the lithia pH glass described in U.S. Pat. No. 2,462,843 issued Mar. 1, 1949 to H. Cary et al. It could also consist of some other pH responsive glass composition such as one of those described in U.S. Pat. Nos. 2,497,235 issued Feb. 14, 1950 to G. A. Perley; 3,025,174 issued Mar. 13, 1962 to W. Simon; 2,668,143 issued Feb. 2, 1954 to P. T. Gilbert, Jr. et al. or the like. A pNa responsive glass is described in U.S. Pat. No. 2,829,090 issued Apr. 1, 1958 to G. Eisenman et al. and a pK responsive glass is described in U.S. Pat. No. 3,041,252 issued June 26, 1962 to G. Eisenman et al. All of the aforementioned glasses are relatively low-resistivity glasses having resistive values in the order of $10^9$ to $10^{10}$ ohm-cm. In order to insure that the bond between the glass membrane and the stem remains temperature stable, the glass composition chosen for the stem 20 should have substantially the same thermal coefficient of expansion as the ion-sensitive glass over the temperature range in which it is desired to form or operate the electrode structure. Although the thickness of membrane 32 could be less than 10 microns in small, low impedance electrode structures, it is preferred that the thickness be between 10 and 20 microns to form low impedance electrode structures. To form general purpose laboratory electrode structures for use with conventional high impedance electrometric equipment, the membrane wall thickness may be between 0.001 in. and 0.002 in. for a bulb-shaped membrane approximately 0.3 in. in diameter. Depending upon the particular glass used for the membrane, a minimum thickness will be reached below which it is no longer useful for monitoring ion activity. Furthermore, the range of membrane thicknesses for any particular electrode structure depends upon such parameters as membrane glass composition, active membrane area, desired impedance, and the like.

A thin, continuous, strongly bonded, conductive electrode 34 is disposed on at least a portion of the inner surface of membrane 32. Electrode 34 preferably covers the entire inner surface of membrane 32 and extends to retaining ring 28 so that it makes electrical contact therewith. Since lead wire 22 extends beyond retaining ring 28 along a portion of the inner surface of membrane 32, electrode 34 makes good electrical contact thereto. A film 36 of silane is deposited on the inner surfaces of electrode 34 and stem 20 to prepare these surfaces for a layer 38 of non-conductive backing material such as epoxy, wax, glass, plastic or the like.

The electrode structure of FIGS. 1 and 2 can be fabricated in the following manner. The end of a glass stem 20 is flared, a section of small diameter silver wire is inserted therein so that it extends beyond both ends of the stem, and retainer ring 28 is forced into the flared end, thereby securing lead wire 22. The end of wire 22 adjacent to ring 28 is bent away from the flared end of stem 20 and into the interior thereof. A small gob of ion-sensitive glass is picked up on the flared end of stem 20 and a spherically shaped membrane 32 is blown. The stem may then be cut to desired length by passing a hot platinum wire therethrough to provide a smooth, fire-polished end. The system so formed may be flame-annealed to relieve unwanted stresses.

Lead wire 22 is pressed into contact with the inner surface of membrane 32 and a thin, continuous, strongly bonded conductive film electrode 34 is applied to at least a portion of the inner surface of the membrane. Electrode 34 preferably contacts ring 28 as well as that portion of wire 22 extending therefrom. Whereas thermal reduction of metallic compounds produced a conductive film which bonded well to the glass membrane, vapor deposited and chemically reduced conductive films performed relatively poorly due to their poor adhesion to the glass. Perhaps the heating cycle to which the thermally deposited films were subjected formed an intermediate metal-glass layer which adhered well to the pure metal layer. The thermally reduced metallic layer can be formed by applying a coating of a solution of an organo-metal compound to the glass membrane and firing at an appropriate temperature. The organo-metal solution may be applied by any convenient method such as wash coating, brushing, spraying, or the like. A particularly suitable method for applying a coating of the solution to the inner surface of a bulbous membrane is illustrated in FIG. 3. Stem 20 may be secured in a chuck 40 which is rotated slowly while a layer of organo-metal solution is applied to membrane 32 from a hypodermic needle 42. Stem 20 is then removed from chuck 40 and the membrane-stem composite is heated to at least 171°C. in order to volatilize the organic constituents in the coating and to deposit a continuous, metallic silver film. In order to produce a strongly bonded silver film, the membrane should be heated to a higher temperature up to a maximum of about 870°C, provided that the softening points of the membrane glass and stem glass are not exceeded.

In accordance with a preferred heat treatment cycle, the electroded membrane is placed into a furnace, the temperature of which is about 300°C. The furnace temperature is then rapidly increased to about 550°C for about 30 seconds to reduce the organo-metal solution and to provide a good bond between the resultant metal film and the membrane. The electroded membrane is heated in a closed furnace at 550°C. for 5 to 10 minutes to promote better adhesion of the conductive film to the membrane. The metal-coated membrane can then be removed from the furnace, and the temperature thereof can be quickly reduced to room temperature. It was found that a continuous metallic film having a thickness between about 1-3 microns thick possessed the necessary properties for an ion-sensing electrode structure. The metallic film should be thick enough that it is continuous but not so thick that the rate of expansion thereof adversely affects the strength of the electrode structure. Good electrodes were obtained by using an organo-silver compound known as Engelhard-Hanovia liquid organic silver No. 9374 which contains 18.0 percent silver and 0.15 percent rhodium. Other organo-metal solutions could be used to provide a conductive film of gold, tin, lead, platinum, palladium, nickel, cobalt, tantalum, chromium, cadmium, copper, vanadium or the like.

At this point of the manufacturing process the electrode structure is extremely fragile. However, a solid structure which is much stronger than conventional liquid-filled electrodes can be made by forming upon the surface of electrode 34 and the adjacent end of stem 20 a layer 38 of a solid material such as epoxy, wax, glass, plastic or the like. The backing material is cured or solidified at a temperature sufficiently higher than the temperature at which the electrode structure is to be used so that contraction of the backing material during curing places the membrane in a state of compression, thereby strengthening the same. Since epoxy provides a good seal, does not deleteriously affect the electroded membrane, and results in an extremely strong electrode structure, the use of this material is preferred. Prior to forming layer 38, the surface to be covered thereby is treated with a 1 percent solution of silane to form a film 36 which enhances bonding of the reinforcing material. Dow Corning Z6040 silane, which was used for this process, is an epoxy functional material, glycidoxy-propyl trimethoxy silane. Both the surface of stem 20 and the conductive electrode surface are compatible with the silane solution, and both are therefore treated in preparation for the reinforcing layer 38.

After the silane film 36 is thoroughly dried, a coating of an epoxy such as Hysol C9 4207 is applied to the electrode structure which may then be periodically inverted or rotated to achieve an even coating. The epoxy is cured by heating the coated assembly at an elevated temperature for a period of time which is usually between 16 and 24 hours. Since the thermal coefficient of expansion of the epoxy is usually about three times greater than that of the glass, the epoxy should be cured at a temperature sufficiently higher than the temperature at which the resultant electrode structure is to be used so that the shrinkage of the epoxy causes the glass membrane to be placed in a state of compression at use temperatures, thereby greatly increasing the strength of the glass membrane and the overall electrode structure. An unnecessarily high curing temperature may cause unnecessarily high compressive stress to exist in the electrode glass at use temperatures much lower than the curing temperature. Therefore, the curing temperature should be selected to give optimum electrode properties over the anticipated range of use temperatures.

One end of tube 14 is flared and the other end thereof is provided with an end cap 16 through which cable 18 extends. Inner conductor 24 is soldered to lead wire 22, and silicone 30 is applied to stem 20 which is then inserted into tube 14. Cable 18 should be rigidly attached to cap 16 to prevent breakage of the lead wire or solder joint due to withdrawal of the cable from the electrode structure.

Rugged, general purpose, dip-type electrodes of the type illustrated in FIGS. 1 and 2 were fabricated in accordance with the aforementioned method. A silver lead wire having a 0.005 in. diameter was secured by a conductive ring to the flared end of a glass stem having an outside diameter of 8 mm. and an inside diameter of 6 mm. Alternatively, the silver lead wire could be soldered to the conductive electrode after the electrode is formed on the membrane. A bulb of lithia pH glass having a diameter of about 0.3 in. and a wall thickness between 0.001 in. and 0.002 in. was formed on the flared end. The stem was cut to a length of about 1 in., and a continuous silver electrode was formed on and bonded to the inner surface of the bulb-shaped pH glass membrane. After the inner bulb surface was treated with silane and dried, a coating of epoxy having a thickness between 0.005 in. and 0.010 in. was applied and cured at 80°C. for about 18 hours. A 5 in. section of 12 mm. stem glass was flared at one end to receive the flared end of the 8 mm. stem. The shielded cable and end cap were attached as indicated hereinabove.

The aforementioned epoxy curing cycle insures that the glass membrane will not be weakened during ordinary use by going into tension. Prestressing the glass in the aforementioned manner and utilizing a bonding material which adheres tenaciously to the electrode and glass surfaces result in a system which will withstand thermal shock up to +100°C from −5°C. Even though the glass membrane is extremely thin, it is sufficiently strong because the compressive strength of the glass is the only property of interest at normal use temperatures. Thus, with a good glass-epoxy bond, the composite electrode structure possesses almost as much mechanical strength as the solid epoxy backing alone.

A thicker layer of epoxy could be provided by inserting a mold core through stem 20 and into the interior of the bulbshaped membrane and casting the epoxy between the mold and the electrode structure. Depending upon such parameters as the expansion coefficients of the glass and the epoxy, the curing temperature, and the range of temperatures to which the resultant electrode will be exposed, there is a maximum thickness in which the epoxy layer should be formed. However, if an electrode structure is to be used at temperatures within a narrow temperature range, the interior of the bulb could be entirely filled with epoxy, but undesirably large stresses could exist in the glass membrane of such a structure at temperatures sufficiently below the epoxy curing temperature. Such electrode structures having solid epoxy interiors could not satisfactorily withstand the stresses incurred under temperature recycling between −5°C and +100°C, a temperature range through which an electrode having a thin layer of epoxy could be recycled without breakage. Electrodes which have been fabricated with epoxy layers between 0.005 in. and 0.01 in. in thickness are at least 2 to 3 times stronger than conventional liquid filled electrodes, a very adequate strength for general purpose electrodes.

The solid pH electrode structure described hereinabove is similar in pH response to good quality laboratory liquid-electrolyte electrodes, since the same high quality pH glass is used for the sensing membrane and therefore, the electrodes are essentially the same externally. The major difference between these two types of electrode structures results from the fact that the sensing membrane of electrode structures constructed in accordance with the present invention are reinforced with a strongly adherent solid internal structure. By proper choice of internal structure materials and proper processing thereof, the solid pH electrode structure can be made to take impact and physical shock many times greater than any liquid-electrolyte glass electrode structure commercially available at the present time.

In addition to their high strength, electrode structures formed in accordance with the present invention possess other advantages such as versatile geometry and low impedance. Almost any shape electrode structure can be made that can be formed from ion-sensitive glass, metallized and reinforced, as strength is not achieved in a self-supporting glass membrane. Very thin membranes can be used to achieve low impedance, or very small electrode structures can be made that have moderate impedance. These properties allow the electrode structure to be tailored to many special applications not adequately met by conventional construction. Following is a description of some of the other many embodiments of the present invention. The silane film is not shown in these embodiments for the sake of simplicity.

The electrode structure in FIG. 4 includes an ion-sensitive membrane 46 formed as a bulb enclosing one end of glass stem 48. A well-adhering conductive electrode 50 is disposed on the inner surface of membrane 46 and an electrically conductive lead 52 makes electrical contact to conductive electrode 50 by a hook-shaped end portion 54 which exerts a spring contact force on the electrode. Both the bulb-shaped membrane 46 and stem 48 are completely filled with a solid mass of backing material 56 to increase the strength thereof. Unlike the embodiment of FIGS. 1 and 2, stem 48 of this embodiment acts as the support member by which the electrode structure is handled.

The embodiment illustrated in FIG. 5 is especially well suited for applications such as the ion-sensing radio capsule disclosed in the aforementioned application Ser. No. 158,293 wherein very small, low impedance ion-sensitive electrode structures are required. In this embodiment, a cylindrically shaped conductive electrode 60 is formed upon a portion of the inner surface of a cylindrically shaped ion sensitive glass membrane 62. Electrical contact is made to the conductive electrode 60 by a short length of fine conductive lead wire 64 which is electrically connected to a larger diameter conductive lead wire 66 by a solder connection 68. Depending upon the use to which this electrode structure is put, that portion of wire 66 extending from the electrode structure may be provided with a layer 70 of insulation. A layer 72 of epoxy or other non-conductive backing material is disposed on the surface of conductive electrode 60 and the exposed portion of membrane 62 adjacent thereto.

Figure 6:
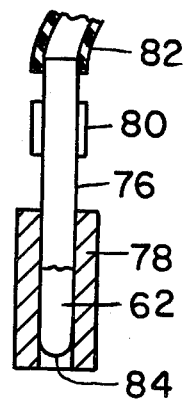
FIGS. 6–9 illustrate some of the steps in the construction of the electrode structure of FIG. 5.

The embodiment illustrated in FIG. 5 can be fabricated in the following manner. The end of a hollow glass stem 76 is immersed in a pool of molten ion-sensitive glass, and after a small gob of glass has become adhered thereto, it is placed in a cylindrical carbon mold 78, the cross section of which is shown in FIG. 6. A guide 80 aligns the stem glass properly in mold 78. An air line 82 is attached to the stem, and the cylindrical membrane 62 is blown. Depending upon the type of ion-sensitive glass which is utilized, the electrode impedance is usually too high for use in radio capsules, when the membrane thickness exceeds about 20–30 microns. The fragile membrane 62 is removed from mold 78 and is handled by the attached stem 76 while some of the subsequent steps are performed. Tip 84 of membrane 62 is removed to facilitate the formation of electrode 60 on a portion of the inner surface of the membrane. Tip 84 may be severed by passing a hot platinum wire through the membrane to provide a smooth, fire-polished electrode end. The end of the cylindrical membrane may be flame-polished to give temporary added strength, and the system may also be flame-annealed to relieve unwanted stresses.

Figure 7:
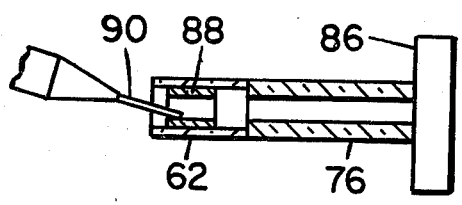

Referring to FIG. 7, a thin, continuous, strongly bonded conductive film is applied to at least a portion of the inner surface of membrane 62 by a method similar to that described in conjunction with FIG. 3. Stem 76 is secured in a lathe chuck 86 which is rotated slowly while a layer 88 of organo-metal solution is applied to membrane 62 from a hypodermic needle 90 which extends into the end of the membrane from which tip 84 has been severed. After stem 76 has been removed from chuck 86, the membrane-stem composite is subjected to an elevated temperature in accordance with the method described in conjunction with the fabrication of the embodiment of FIGS. 1 and 2.

As shown in FIG. 5, electrical connection is preferably made to electrode 60 by attaching a fine electrical contact lead 64 to electrode 60 by using another application of organo-metal compound at the point where lead 64 contacts the conductive electrode and firing for a time sufficient to form a metallic connection. Larger diameter lead 66 is then electrically connected to lead 64 by solder 68 or the like. The diameter of lead 66 should be at least twice that of fine lead 64, lead 64 consisting of 0.001 in. diameter silver wire and lead 66 consisting of 0.005 in. diameter silver wire in one particular embodiment. Fine wire 64 and solder connection 68 are so positioned that they will be completely covered with a non-conductive backing material to be applied in a subsequent step. Fine lead wire 64 can be easily and safely attached to electrode 60 by small amount of silver, and the subsequent attachment of wire 66 and encasing thereof in backing material provides a fairly strong electrical lead extending from the resultant smooth cast surface.

As shown in FIG. 5, a length of unsilvered ion-sensitive glass 92 is retained to provide improved insulation in the completed electrode structure. If the length of section 92 is greater than that required for the completed electrode structure after electrode 60 has been formed, a portion of section 36 may be severed by using a hot platinum wire to give a smooth, fire-polished electrode end. Excess portions of glass membrane have been removed by sawing and grit-blasing, but these methods may leave undesirable small cracks or strains in the glass.

Figure 8:
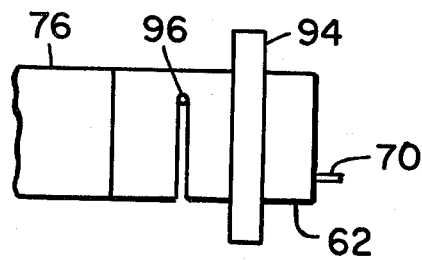
Figure 9:
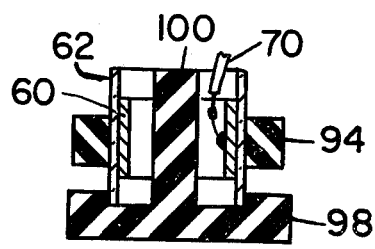

The glass cylinders are washed in hot trichlorethylene, acetone, and alcohol and rinsed in flowing deionized water. After drying, a soft silicone washer 94 is placed over membrane 62 in the vicinity of the conductive electrode 60. A hot platinum wire is again used to cut the electrode structure to finished length, again leaving a length of membrane glass extending beyond the conductive electrode 60. Silicone washer 94 acts as a cushion and supports the fragile electrode structure as it is parted from the stronger stem 76. Washer 94 also serves as a place to grip the electrode structure for further processing. The inner surface of the thin glass membrane-electrode assembly resulting from the severing step of FIG. 8 is treated with a silane solution as described in conjunction with FIGS. 1 and 2. A mold such as that illustrated in FIG. 9 may then be utilized to form the thin layer 72 of epoxy. The electroded membrane is placed on a silicone mold 98 having a core 100 projecting through the hollow cylindrical structure as shown in this figure. Epoxy is cast between the glass membrane and the mold portion 100. This assembly is heated at an elevated temperature sufficiently higher than the temperature at which the electrode structure is to be utilized until the epoxy is cured. The use temperature of a radio capsule to be swallowed by a human being is about 37°C. Electrode structures for use in this type of radio capsule were heated to about 60°C for a period of time between 16 and 24 hours to properly cure the epoxy. Epoxy end caps 102 may be added to the structure formed by the mold of FIG. 9 to protect the end portions of membrane 62. If the electrode structure of FIG. 5 is to be incorporated into a housing such as a radio capsule, part of that housing may be formed so that it overlaps the end portions of the membrane 62 in a manner similar to that in which epoxy end caps 102 overlap the membrane.

The reinforced glass electrode structure of FIG. 5 maintained the accuracy of response of conventional liquid-filled laboratory electrode structures and yet had the lower impedance and greater strength that are required for radio capsule use. The added advantages of rapid response to pH change and low preconditioning times were also obtained from this type of electrode construction. The high accuracy is obtained by using the same high quality ion-sensitive glass that is used in good laboratory electrodes. The low impedance is made possible by the use of very thin glass membranes and well adhering conductive electrodes which are strengthened by the solid, well bonded epoxy backing material. A low response time of less than one second, and a short solution preconditioning time are mainly the result of the low impedance and extreme thinness of the glass membrane. The impedance of cylindrical electrode structures having a diameter of about 0.3 in. and a length of about 0.3 in. was between 15 and 40 megohms. Conventionally made electrode structures of similar size usually have an impedance between 100 and 500 megohms. A low resistivity lithia pH glass was utilized in the construction of an electrode structure of the type shown in FIG. 5. When immersed in a pH 7 test solution, this electrode structure exhibited a maximum variation of 5 millivolts in measuring a substantially constant potential of 100 millivolts to a silver-silver chloride reference electrode over a period of 18 hours while at a substantially constant temperature of 25°C.

Figure 10:
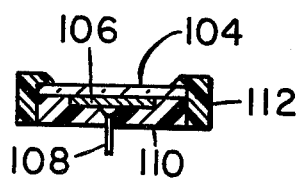
- FIG. 10 is a cross-sectional view of a flat ion-sensitive electrode structure.

The method of the present invention can be used to construct electrode structures such as the flat electrode structure of FIG. 10 because ultimate strength is not dependent upon glass thickness or geometry. This flat electrode structure may be formed by blowing a thin-walled ion-sensitive glass member having one or more flat surfaces which can be subsequently cut to form the flat membrane 104. A conductive electrode 106 can be fired onto membrane 104 and a conductive lead 108 may be attached to the conductive electrode in accordance with the techniques described hereinabove. An epoxy layer 110 may be formed on the electroded surface of membrane 104, and after curing, the resultant strengthened electrode structure can be cut to the desired shape. If desired, an epoxy ring 112 may be added to further enhance the strength of the electrode structure.

Figure 11:
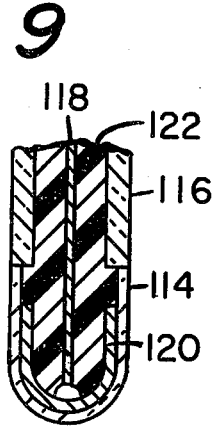
FIG. 11 is a cross-sectional view of an electrode structure in which the ion-sensitive membrane forms a continuous extension of the stem.

In the embodiment of FIG. 11 membrane 114 has been formed at the end of hollow glass stem 116 by the method illustrated in FIG. 6. Electrically conductive lead 118 makes electrical contact to the conductive electrode 120. Since membrane 114 is extremely thin and fragile when formed, it is filled with potting material 122 to form an electrode structure which is stronger than conventional liquid-filled electrodes even though the ion-sensing membrane thereof may be much thinner than those of conventional liquid filled electrode structures.

We claim:

1. An electrode structure for measuring activity of an ionic species in an ion containing solution, said structure comprising, in combination:
   a curved membrane of glass sensitive to said ionic species, said membrane having a convex surface that is adapted to contact said solution and a concave surface opposite said convex surface, said membrane being in a state of compression,
   thin film conductive electrode means disposed on at least a portion of said concave surface of said membrane for providing a strongly bonded electrical connection thereto,
   a conductive lead wire,
   connecting means for providing an electrical connection between said lead wire and said conductive electrode, and
   a mass of non-conductive backing material strongly adherent to said conductive electrode means and to any portion of said concave surface of said membrane on which said conductive electrode is not disposed, the thermal coefficient of expansion of said backing material being substantially greater than that of said glass membrane, said backing material reinforcing said electrode structure as well as providing an insulating coating therefor.

2. An electrode structure in accordance with claim 1 wherein said backing material is selected from the group consisting of plastics, glass and wax.

3. An electrode structure in accordance with claim 2 wherein said conductive electrode consists of a material selected from the group consisting of silver, gold, platinum, palladium, tin, lead, nickel, cobalt, tantalum, chromium, cadmium, copper and vanadium.

4. An electrode structure in accordance with claim 3 wherein said conductive lead wire includes an end portion which exerts a force against said conductive electrode.

5. An electrode structure in accordance with claim 3 further comprising a hollow glass stem, said glass membrane being disposed on one end of said stem.

6. An electrode structure in accordance with claim 5 wherein the end of said stem to which said membrane is attached is flared and said membrane is spherically shaped.

7. An electrode structure in accordance with claim 3 wherein said glass membrane is cylindrically shaped.

8. An electrode structure in accordance with claim 7 wherein said electrode is disposed at the end of a hollow glass stem, the outside diameters of said stem and said membrane being substantially equal, the end of said cylindrically shaped membrane opposite said stem being closed by a spherically shaped portion.

9. An electrode structure in accordance with claim 1 wherein said mass of backing material comprises a thin coating.

10. An electrode structure in accordance with claim 1 wherein a portion of said lead wire directly contacts said membrane and a portion of said conductive electrode means is disposed on that side of said lead wire which is opposite said membrane so that said portion of said lead wire directly contacts a portion of said membrane and a portion of said conductive electrode means.

11. An electrode structure for measuring activity of an ionic species in an ion containing solution, said structure comprising, in combination:
  a hollow glass stem having a flared end,
  a spherically shaped glass membrane disposed at the flared end of said glass stem, said glass membrane being sensitive to said ionic species,
  a thin film conductive electrode disposed on and strongly bonded to at least a portion of the inner surface of said membrane, said conductive electrode consisting of a material selected from the group consisting of silver, gold, platinum, palladium, tin, lead, nickel, cobalt, tantalum, chromium, cadmium, copper and vanadium,
  a conductive lead wire,
  a retainer ring disposed in the flared end of said stem, said lead wire extending between said stem and said retainer ring, the end of said lead wire contacting said conductive electrode, and
  a mass of non-conductive backing material strongly adherent to said conductive electrode and to any portion of said membrane on which said conductive electrode is not disposed, said backing material being selected from the group consisting of plastic, glass and wax, thermal coefficient of expansion of said backing material being greater than that of said glass membrane and said glass membrane being in a state of compression, said backing material reinforcing said electrode structure as well as providing an insulating coating therefor.

12. An electrode structure in accordance with claim 11 further comprising a glass supporting tube surrounding and being spaced from said stem, said tube having a flared end disposed adjacent to the flared end of said stem, and a mass of resilient bonding material disposed between said stem and said tube.

13. An electrode structure in accordance with claim 12 wherein the length of said tube is greater than that of said stem, said tube having a cap on the end thereof opposite said flared end, a shielded cable extending through said cap, said shielded cable including a central conductor electrically connected to said lead wire.

14. An electrode structure in accordance with claim 13 further comprising a thin film of silane disposed between said non-conductive backing material and the adjacent portions of said electrode and said membrane.

15. An electrode structure in accordance with claim 14 wherein said electrode consists of silver and said backing material consists of epoxy.

16. An electrode structure for measuring activity of an ionic species in an ion containing solution, said structure comprising, in combination:
  a cylindrically shaped membrane of glass sensitive to said ionic species,
  a thin film conductive electrode disposed on and strongly bonded to at least a portion of the inner surface of said membrane, said conductive electrode consisting of a material selected from the group consisting of silver, gold, platinum, palladium, tin, lead, nickel, cobalt, tantalum, chromium, cadmium, copper and vanadium,
  a conductive lead wire having first and second opposed ends, said first end being soldered to said conductive electrode,
  a second wire electrically connected to the second end of said lead wire, the diameter of said second wire being at least twice that of said lead wire, and
  a mass of non-conductive backing material strongly adherent to said conductive electrode and to any portion of said membrane on which said conductive electrode is not disposed, said backing material being selected from the group consisting of plastic, glass and wax, the thermal coefficient of expansion of said backing material being greater than that of said glass membrane and said glass membrane being in a state of compression, said backing material reinforcing said electrode structure as well as providing an insulating coating therefor, said conductive lead wire and the point of electrical connection of said conductive lead wire and said second wire being encased in said mass of non-conductive material.

17. An electrode structure in accordance with claim 16 wherein said electrode consists of silver and said backing material consists of epoxy, said electrode structure further comprising a thin film of silane disposed between said epoxy and the adjacent portions of said electrode and said membrane.

18. An electrode structure for measuring activity of an ionic species in an ion containing solution, said structure comprising, in combination:
  a tubular glass stem,
  a curved membrane of glass sensitive to said ionic species, said membrane being disposed on and closing one end of said stem, said membrane having a convex surface that is disposed on the outside of said electrode structure and being adapted to contact said solution, and a concave, inner surface opposite said convex surface, said membrane being in a state of compression,
  thin film conductive electrode means disposed on at least a portion of said concave surface of said membrane for providing a strongly bonded electrical connection thereto,
  a conductive lead wire disposed within said stem,
  means for connecting said lead wire to said electrode means, and
  a mass of non-conductive backing material strongly adherent to said conductive electrode means and to any portion of said concave surface of said membrane on which said conductive electrode is not disposed, the thermal coefficient of expansion of said backing material being substantially greater than that of said membrane.

19. An electrode structure in accordance with claim 18 wherein said backing material consists of a layer of plastic.

20. An electrode structure in accordance with claim 19 wherein at least a portion of said membrane is spherically shaped.

21. An electrode structure in accordance with claim 20 wherein said electrode means covers the entire concave surface of said membrane.

* * * * *